United States Patent [19]
LaDue et al.

[11] Patent Number: 5,867,394
[45] Date of Patent: *Feb. 2, 1999

[54] DOCUMENT DISPENSER OPERATIONAL PROGRAM DOWNLOADING

[75] Inventors: Philip G. LaDue, Bellbrook; Lance E. Kelley, Springfield; John H. King, Kettering, all of Ohio

[73] Assignee: The Standard Register Company, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 609,507

[22] Filed: Mar. 1, 1996

[51] Int. Cl.$^6$ ............... G06F 19/00; G06G 7/04; G06G 7/66

[52] U.S. Cl. ............... 364/479.01; 364/479.03; 364/479.04; 364/479.05; 364/479.71

[58] Field of Search ............... 364/479, 900, 364/325, 707, 479.01, 479.03, 479.04, 479.05, 479.11, 478.02, 478.06, 478.11; 395/200.08, 430, 200.01, 700, 185.33

[56] References Cited

U.S. PATENT DOCUMENTS

| | | | |
|---|---|---|---|
| 4,716,543 | 12/1987 | Ogawa et al. | 364/900 |
| 4,757,543 | 7/1988 | Tamada et al. | 380/51 |
| 4,918,604 | 4/1990 | Baum | 364/413.01 |
| 5,060,980 | 10/1991 | Johnson et al. | 283/70 |
| 5,132,915 | 7/1992 | Goodman | 364/479 |
| 5,173,851 | 12/1992 | Off et al. | 364/401 |
| 5,243,174 | 9/1993 | Veeneman et al. | 235/381 |
| 5,317,646 | 5/1994 | Sang, Jr. et al. | 382/9 |
| 5,319,562 | 6/1994 | Whitehouse | 364/464.03 |
| 5,333,278 | 7/1994 | Miyazono | 395/325 |
| 5,347,451 | 9/1994 | Fujiwara et al. | 364/405 |
| 5,349,534 | 9/1994 | Rousseff et al. | 364/479 |
| 5,351,994 | 10/1994 | Pollin | 283/117 |
| 5,408,417 | 4/1995 | Wilder | 364/479 |
| 5,464,087 | 11/1995 | Bounds et al. | 194/200 |
| 5,477,037 | 12/1995 | Berger | 235/379 |
| 5,504,904 | 4/1996 | Dayan et al. | 395/700 |
| 5,528,758 | 6/1996 | Yeh | 395/200.08 |
| 5,532,945 | 7/1996 | Robinson | 364/707 |
| 5,552,994 | 9/1996 | Cannon et al. | 364/468.01 |
| 5,555,496 | 9/1996 | Tackbary et al. | 364/401 R |
| 5,563,999 | 10/1996 | Yaksich et al. | 395/149 |
| 5,574,859 | 11/1996 | Yeh | 395/200.01 |
| 5,581,503 | 12/1996 | Matsubara et al. | 365/185.33 |
| 5,583,778 | 12/1996 | Wind | 364/464.01 |
| 5,596,738 | 1/1997 | Pope | 395/430 |
| 5,625,776 | 4/1997 | Johnson | 395/227 |

*Primary Examiner*—Reba I. Elmore
*Assistant Examiner*—Ramesh Patel
*Attorney, Agent, or Firm*—Killworth, Gottman, Hagan & Schaeff LLP

[57] ABSTRACT

A document dispensing system comprising an operational program data transfer device and a document dispenser having a document variables data input terminal, a document printer, a digital data input port coupled to the operational program data transfer device, an operational program storage device, a reprogram storage device, and a digital controller programmed to store new operational program data in the operational program storage device and to control the document printer in accordance with the document variables data and the new operational program data. A replacement document dispenser operational program is downloaded from the data transfer device to the operational program data storage device via the digital data input port.

25 Claims, 2 Drawing Sheets

Microfiche Appendix Included
(2 Microfiche, 83 Pages)

DOCUMENT DISPENSER OPERATIONAL PROGRAM DOWNLOADING

Reference is made to a Microfiche Appendix hereto, having a total of two microfiche and a total of 83 frames.

BACKGROUND OF THE INVENTION

The present invention relates to document dispensing systems and, more particularly, to document dispensing systems including a digital controller which controls the operation of the dispenser according to a predetermined operational program.

Conventional digitally controlled document dispensers and document dispensing systems operate according to a software program stored in an integrated circuit memory installed in the dispenser electronics. A particular document dispenser may become inadequate or obsolete as a particular dispenser operator's needs change. An inadequate or obsolete dispenser must either be replaced or physically modified to update its operating characteristics. Replacement or physical modification of document dispensers is a labor intensive and time consuming process because it is necessary for a technician to visit each dispenser. Thus, according to the conventional dispenser arrangement, the advantages of updating or modifying a particular dispenser or group of dispensers are often outweighed by the costs involved in performing the update or modification. The imbalance between cost and advantage is particularly acute in document dispensing systems employing a plurality of document dispensers. As a result, many dispensers will not be updated or modified even if an advantageous modification is available. Further, in dispensing systems employing a plurality of document dispensers, it may often only be cost effective to modify or update a portion of the dispensers in the group because of the limitations of the conventional modification and updating process. The resulting lack of dispensing system uniformity is likely to lead to confusion and inefficient system management. Accordingly, there is a need for a means by which the operating characteristics of a single document dispenser, or a group of document dispensers, can be updated and modified at a reduced cost and with an minimal amount of manual labor.

SUMMARY OF THE INVENTION

This need is met by the present invention wherein a new document dispenser software program is downloaded to the memory of a digitally controlled document dispenser or to each memory of a group of digitally controlled document dispensers.

In accordance with one embodiment the present invention, a document dispenser is provided comprising: a digital bus; a document variables data input terminal coupled to the digital bus; a document printer coupled to the digital bus; a digital data input port coupled to the digital bus; an operational program storage device coupled to the digital bus; a reprogram storage device; and, a digital controller coupled to the digital bus, programmed to cause operational program data received at the digital data input port to be stored in the operational program storage device, and programmed to control the document printer in accordance with the document variables data and the operational program data.

The digital controller may be programmed to cause the document dispenser to switch execution between the operational program storage device and the reprogram storage device. Preferably the dispenser is further programmed to switch execution from the operational program storage device to the reprogram storage device prior to causing storage of operational program data received at the digital data input port in the operational program storage device and to switch execution from the reprogram storage device to the operational program storage device after storage of the operational program data received at the digital data input port in the program storage device.

The document variables data input terminal may comprise a dispenser keyboard or a communications port. Similarly, the digital data input port may comprise a communications port. The digital data input port may be coupled to a file storage device which stores operational program data and enables transfer of the operational program data to the digital data input port.

The digital controller may be further programmed to replace an operational program resident in the operational program storage device with a new operational program. The operational program storage device and the reprogram storage device may comprise an erasable programmable memory. The operational program data may comprise the complete set of document dispenser operating data. The document variables data may comprise a user-selected set of values corresponding to a predetermined set of document variables.

In accordance with another embodiment of the present invention, a method of dispensing documents is provided comprising the steps of: providing at least one document dispenser having a digital data input port, an operational program data storage device, and a reprogram storage device; providing an operational program data transfer device; and, downloading a document dispenser operational program from the data transfer device to the at least one document dispenser via the digital data input port.

The method of dispensing documents may further comprise the step of switching dispenser execution between the operational program storage device and the reprogram storage device. Preferably, the dispenser execution is switched from the operational program storage device to the reprogram storage device prior to the downloading step and switched from the reprogram storage device to the operational program storage device after the downloading step.

The document dispenser may comprise a plurality of document dispensers and the downloading step may comprise selectively downloading the document dispenser operational programs to the dispensers.

In accordance with yet another embodiment of the present invention, a document dispensing system is provided comprising an operational program data transfer device, a document dispenser having a document variables data input terminal, a document printer, a digital data input port coupled to the operational program data transfer device, an operational program storage device, a reprogram storage device, and a digital controller programmed to store operational program data, sent from the operational program data transfer device to the digital data input port, in the operational program storage device and to control the document printer in accordance with the document variables data and the operational program data.

The operational program data transfer device may comprise a host computer and may be located remote from the dispenser or locally coupled to the document dispenser. Alternatively, the operational program data transfer device comprises a file storage and transfer device.

Accordingly, it is an object of the present invention to provide a means by which the operating characteristics of a single document dispenser, or a group of document dispensers, can be updated and modified at a reduced cost and with a minimal amount of manual labor.

DETAILED DESCRIPTION OF THE INVENTION

Figure 1:
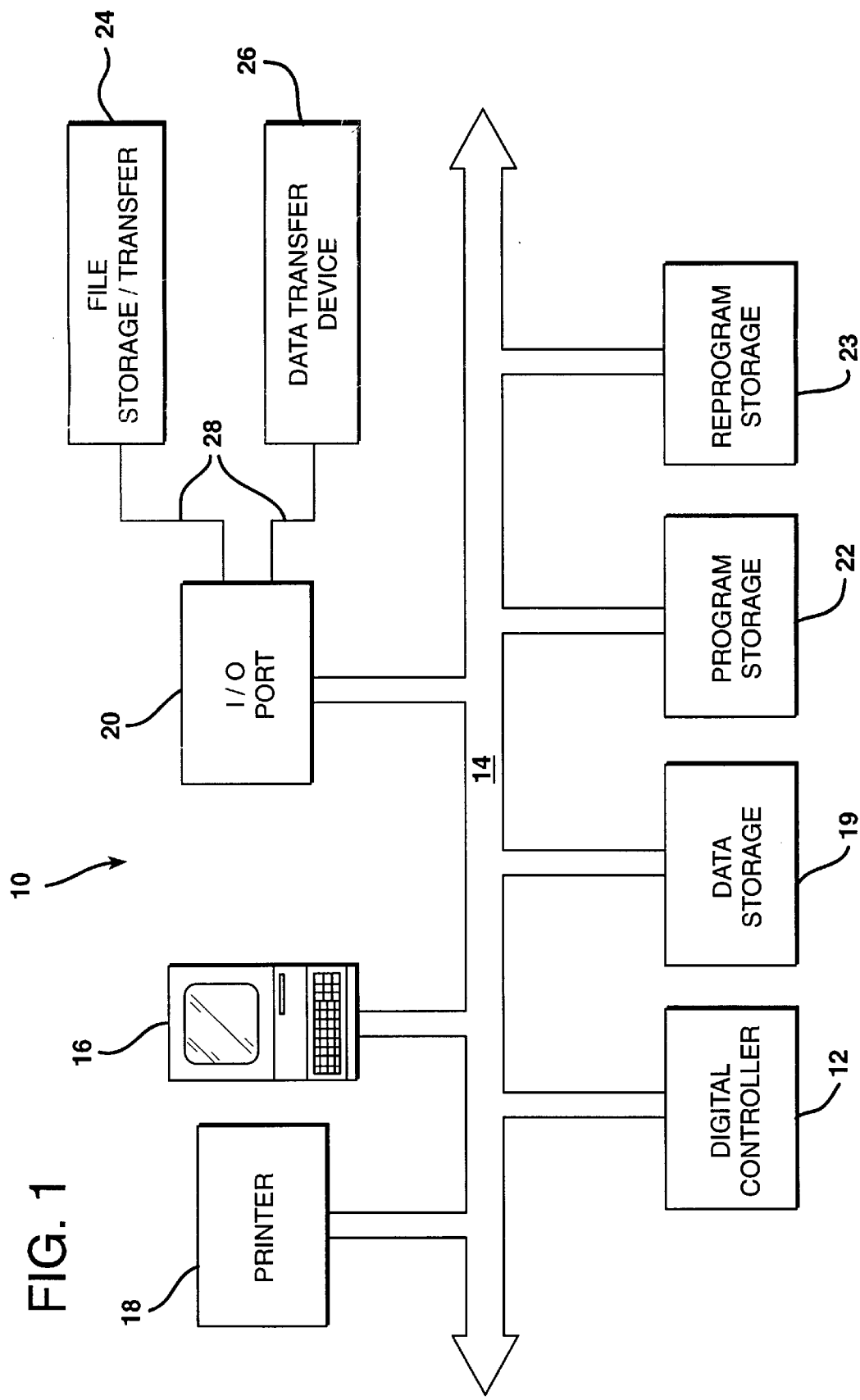
FIG. 1 is a block diagram of the components of a document dispensing system according to the present invention; and, FIG. 2 is an illustration of an alternative embodiment of a document dispensing system according to the present invention.

A dispensing system 10 according to the present invention will be described with reference to FIGS. 1 and 2. A digital controller 12, preferably including a central processing unit (CPU), is coupled to data, address, and control buses, represented generally by the digital bus 14. A document variables data input terminal 16, a document printer 18, and a digital data input/output (I/O) port 20 are in communication with the digital controller 12 via the digital bus 14 and are controlled thereby according to various operating and applications programs resident in a digital operational program data storage device 22. Data processed by the digital controller 12 is stored in a digital data storage device 19. The digital controller 12, digital bus 14, terminal 16, printer 18, input/output port 20, digital data storage device 19, program storage device 22, and a reprogram storage device 23, described below, will be referred to collectively herein as the document dispenser 10. The document dispensing system 10 includes the document dispenser components in addition to a file storage and transfer device 24, data transfer device 26, and data links 28, described below.

The document printer 18 is preferably a printer where substantially all printing which defines the selected document is printed on the printer paper at the time the document is issued.

The document variables data input terminal 16 typically comprises a data communications port, a keypad, or a keyboard. A dispenser operator selects a set of document variable values according to the requirements of the particular document to be dispensed and enters the selected values at the terminal 16. For example, in the event the document dispenser is utilized to dispense money orders, the operator will typically select a money order amount, a payor name, a payee name, a document date, etc. The selected values are then entered at the document variables data input terminal 16.

The operational program storage device 22 is in communication with the digital controller 12 via the digital bus 14 and typically comprises an erasable programmable memory, preferably a FLASH memory, a hard disk drive of a personal computer, or a floppy disk drive unit. It is contemplated by the present invention that, although the document dispenser 10' illustrated in FIG. 2 comprises a stand-alone housing 15 and terminal 16 in communication with a central data transfer device 30, a personal computer coupled to a printer could be modified to form the components of the document dispenser described above.

The digital controller 12 is in communication with the digital data storage device 19 for providing storage of data processed by the digital controller 12. It is contemplated by the present invention that the digital data storage device 19 may be incorporated in the structure of the digital controller 12. Similarly, the data processed by the digital controller may be stored in the operational program storage device 22 or a memory device equipped to store the operational program data and the data processed by the digital controller. Finally, it is noted that the storage devices illustrated in FIG. 1 are indicated as separate structural elements for clarity and it is contemplated by the present invention that the storage devices may be grouped into one or more storage devices having storage areas designated for the distinct storage types.

The file storage and transfer device 24 is coupled to the digital data input/output port 20 through the data link 28. The file storage and transfer device 24 is arranged to store document dispenser operational program data and to enable transfer of the operational program data to the digital data input/output port 20. Similarly, the data transfer device 26 is coupled to the digital data input/output port 20 through the data link 28 and is arranged to store and transfer document dispenser operational program data. The file storage and transfer device 24 may be a floppy disk drive unit including a data storage disk carrying operational program data. The data transfer device 26 may be a host computer coupled to the document dispenser or any peripheral device capable of producing, transferring, or retrieving operational program data. The data input/output port 20 is an RS-232 serial port, a telecommunications port, a parallel port, or any other data connection to the file storage and transfer device 24 and/or the data transfer device 26. The data link 28 may be any type of data carrying connector, e.g., a parallel data cable, an RS-232 serial cable, a telephone line, a fiber-optic data link, or an electromagnetic radiation transmitter/receiver data link. The file storage and transfer device 24 and the data transfer device 26 may be locally coupled to the input/output port 20 through, for example, an serial or parallel cable, or remotely coupled to the dispenser through, for example, a telecommunications connection.

The digital controller 12 is programmed to switch execution from the operational program storage device 22 to the reprogram storage device 23 prior to causing storage of new operational program data received at said digital data input port 20 in the operational program storage device 22, programmed to cause storage of the new operational program data in the operational program storage device 22, and programmed to switch execution from the reprogram storage device 23 to the operational program storage device 22 after storage of the new operational program data in the program storage device 22. In this manner, the dispenser executes from the reprogram storage device 23 while old operational program data in the operational program storage device 22 is erased and while new operational program data is downloaded to the operational program storage device 22. After successful downloading, the dispenser resumes execution from the operational program storage device 22. An example of source code representing this downloading process is presented in appendices A, B, and C, described below.

The digital controller 12 is also programmed to control the document printer 18 in accordance with the operational program data stored in the operational program data storage device 22 and in accordance with document variables data input at the terminal 16. The particular operating program selected for use in the document dispenser is outside the scope of the present invention and, as will be appreciated by one of ordinary skill in the art of document dispensing, a variety of document dispenser operational programs are widely known and used throughout the document dispensing industry. Selection of one particular operational program depends upon the types of documents an operator wishes to dispense and upon the preferences of the dispenser operator.

The document dispensing system 10, arranged as described above, enables a dispensing system operator to download new operational programs from the data transfer device 26 or the file storage and transfer device 24 to the document dispenser as business needs change. Specifically, the digital controller 12 is programmed to replace dispenser operational program data resident in the operational program storage device 22 with new operational program data transferred to the input/output port 20. The downloaded operational program data preferably comprises the complete set of document dispenser operating data. It is contemplated by the present invention, however, that permanent font data, and dispenser security data, e.g., special passcodes, may be temporarily resident in the reprogram storage device 23 to prevent their replacement in the downloading process.

Figure 2:
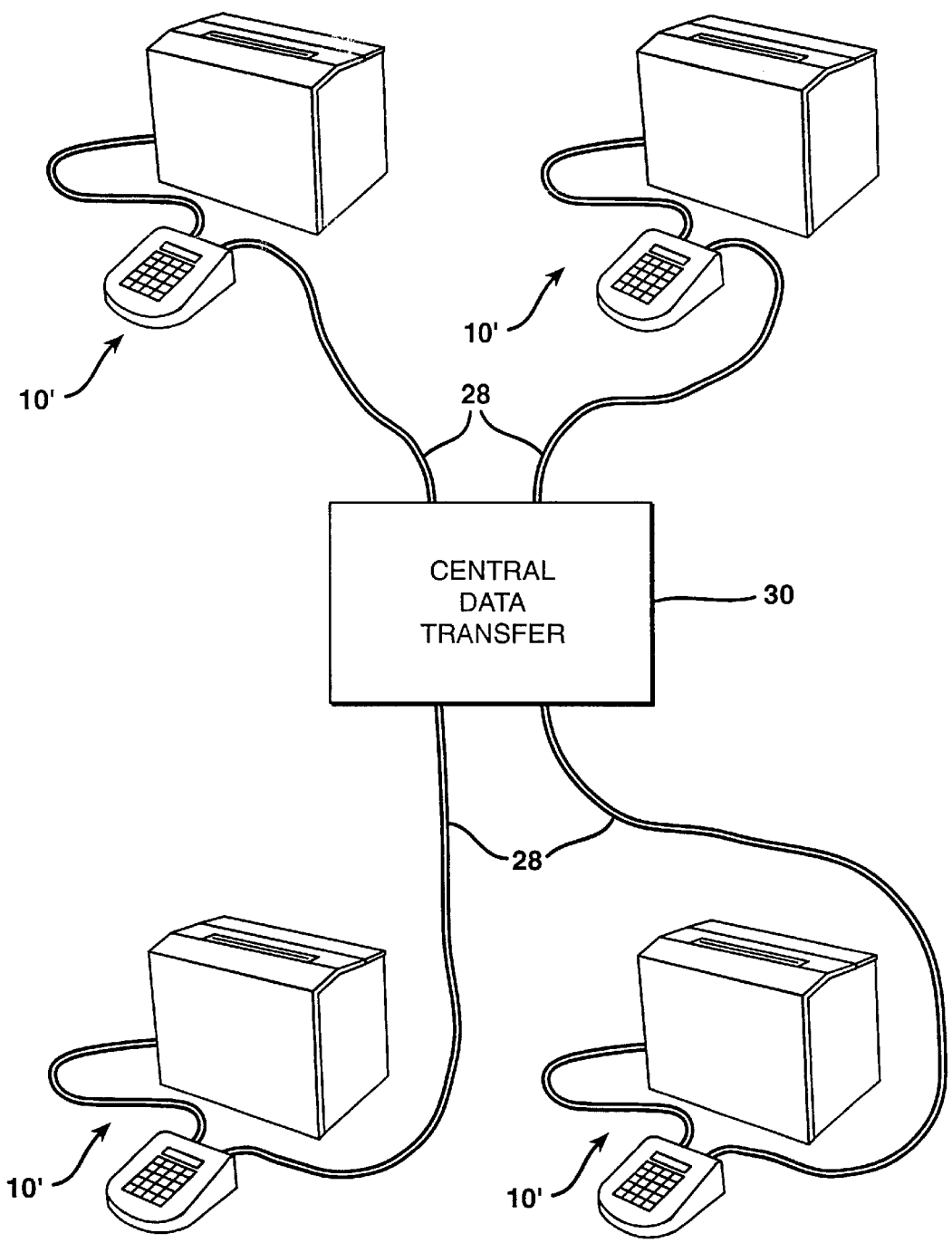

As illustrated in FIG. 2, where like elements are referenced by like reference numerals, the file storage and transfer device 24 and/or the data transfer device 26, represented generally by a central data transfer device 30, may be connected via data links 28 to a plurality of input/output ports (not shown) corresponding to a plurality of document dispensers 10'. In this manner, operational program data may be transferred from the central data transfer device 30 to a plurality of document dispensers 10'.

It is contemplated by the present invention that a variety of document types may be produced by the document dispenser of the present invention. Specifically, money orders, cashiers checks, gift certificates, security documents, data reports, and any other document requiring selection and placement of printed indicia thereon may be dispensed with the system of the present invention. It is further contemplated by the present invention that the memory devices identified herein may employ electronic, magnetic, magneto-optical, electro-optical, or optical data storage without departing from the scope of the present invention.

It is contemplated by the present invention that a variety of source codes may be utilized to enable the operational program downloading described herein. Attached as appendices A and B is an example of source code which enables a document dispenser to download operational program data sent to the input/output port 20. The operational program data may be sent to the input/output port 20 utilizing a variety of techniques, most commonly via a "send file" command generated in a host computer. Attached as appendix C is an example of host computer resident source code capable of sending operational program data to the input/output port 20.

Appendix A is an example of source code resident in the reprogram storage device 23. "COMM.C" contains routines that (i) establish or verify serial communications with a host system, (ii) receive the data that makes up the operational program data, and (iii) set up and calls the routine that erases the program storage device 22 by banks. "XRECV.C" contains the routines that receive a block of data and build a record to pass down to "write_rec( )" in "FLASH.C" to write the data to the program storage device 22. "FLASH.C" resides in the reprogram storage device 23 and contains the routines that erase the program storage device 22 by banks and write the operational program data one byte at a time. "8032.H" contains the hardware data bit declarations for the reprogram storage device 23. "EPROM.C" contains the source code for the main processing loop of the reprogram storage device 23 and calls jump_flash in "CHECKSUM.C" to jump and execute from the program storage device 22. "CHECKSUM.C" contains the routine jump_flash which sets the hardware port MEMJMP to 1 which tells the hardware to execute out of the program storage device 22 upon setting the execution address to 0. "IO.H" masks MEMJMP to the hardware port to control the memory device from which the dispenser executes.

Appendix B is an example of source code resident in the program storage device 22. "COMM.C" contains routines that jump to the reprogram storage device 23 for downloading new operational program data to the program storage device 22 and rebuild the operational program data using data received from a host system via the input/output port 20. "8032.H" contains the hardware data bit declarations for the program storage device 22. "DATA.H" allocates memory for the variable names used by the files resident in the program storage device 22. "OP PROC.C" contains the code that analyzes data input at terminal 16. "CHECKSUM.C" contains the routine jump_eprom which sets the hardware port MEMJMP to 0 enabling the hardware to execute out of the reprogram storage device 23. "IO.H" contains a line that masks MEMJMP to the hardware port that enables the execution device.

In appendix C, "REPROG.BAT" is the file that resides on the host computer. Through a serial data port, "REPROG.BAT" extracts all the operational program data, places the data in one or more files, issues a "DFLASH" command to the dispenser 10 to reprogram the program storage device 22, downloads the files containing the operational program data, verifies that the program storage device 22 was successfully rewritten, and ends. "BADBELL.BAT" and "GOODBELL.BAT" are called by "REPROG.BAT." "TALKMOD.C" is used by "REPROG.BAT" to accept a string or filename to send, wait for a specified time for a response, and compare the communications response with a command-line supplied string.

Having described the invention in detail and by reference to preferred embodiments thereof, it will be apparent that modifications and variations are possible without departing from the scope of the invention defined in the appended claims.

What is claimed is:

1. A digitally controlled document dispenser programmed to operate according to a document dispenser operational program, said document dispenser comprising:
    a document variables data input terminal;
    a digital data input port; and
    a stand alone dispenser housing incorporating
        an internal digital bus positioned within said dispenser housing,
        an internal document printer positioned within said dispenser housing and coupled to said digital bus,
        an internal operational program storage device positioned within said dispenser housing and coupled to said digital bus, wherein a first document dispenser operational program is stored in said internal operational program storage device,
        an internal reprogram storage device positioned within said dispenser housing and coupled to said digital bus, and
        an internal digital controller positioned within said dispenser housing and coupled to said digital bus, wherein said internal digital controller is programmed to cause a second document dispenser operational program received at said digital data input port to be stored in said internal operational program storage device, and control said document printer in accordance with document variables data input at said document variables data input terminal and in accordance with a stored one of said first document dispenser operational program and said second document dispenser operational program in said internal operational program data storage device.

2. A document dispenser as claimed in claim 1 wherein said digital controller is further programmed to cause the document dispenser to switch execution between the operational program storage device and the reprogram storage device.

3. A document dispenser as claimed in claim 2 wherein said digital controller is further programmed to switch execution from said operational program storage device to the reprogram storage device prior to causing storage of operational program data received at said digital data input port in said operational program storage device.

4. A document dispenser as claimed in claim 2 wherein said digital controller is further programmed to switch execution from said reprogram storage device to said operational program storage device after storage of the operational program data received at said digital data input port in the program storage device.

5. A document dispenser as claimed in claim 1, wherein said document variables data input terminal comprises a dispenser keyboard.

6. A document dispenser as claimed in claim 1, wherein said document variables data input terminal comprises a communications port.

7. A document dispenser as claimed in claim 1, wherein said digital data input port comprises a communications port.

8. A document dispenser as claimed in claim 1, wherein said digital data input port is coupled to a file storage device which stores said second operational program and enables transfer of said second operational program to said digital data input port.

9. A document dispenser as claimed in claim 1, wherein said reprogram storage device comprises an erasable programmable memory.

10. A document dispenser as claimed in claim 1, wherein said operational program storage device comprises an erasable programmable memory.

11. A document dispenser as claimed in claim 1, wherein said operational program storage device comprises a data storage device mounted within a personal computer.

12. A document dispenser as claimed in claim 1, wherein said operational program storage device comprises a personal computer readable data storage disk.

13. A document dispenser as claimed in claim 1, wherein said digital controller is further programmed to replace an operational program resident in said operational program storage device with a new operational program.

14. A document dispenser as claimed in claim 1, wherein said second operational program comprises the complete set of document dispenser operating data.

15. A document dispenser as claimed in claim 1, wherein said document variables data comprise a user-selected set of values corresponding to a predetermined set of document variables.

16. A method of dispensing documents comprising the steps of:
providing at least one digitally controlled document dispenser programmed to operate according to a document dispenser operational program, said document dispenser comprising a document variables data input terminal, a digital data input port, and a stand alone dispenser housing, said housing incorporating
an internal digital bus positioned within said dispenser housing
an internal document printer positioned within said dispenser housing and coupled to said digital bus,
an internal operational program storage device positioned within said dispenser housing and coupled to said digital bus, wherein a first document dispenser operational program is stored in said internal operational program storage device,
an internal reprogram storage device positioned within said dispenser housing and coupled to said digital bus, and
an internal digital controller positioned within said dispenser housing and coupled to said digital bus, wherein said internal digital controller is programmed to cause a second document dispenser operational program received at said digital data input port to be stored in said internal operational program storage device, and control said document printer in accordance with document variables data input at said document variables data input terminal and in accordance with a stored one of said first document dispenser operational program and said second document dispenser operational program in said internal operational program data storage device;
providing an external operational program data transfer device positioned outside of said dispenser housing; and,
downloading said second document dispenser operational program from said data transfer device to said operational program data storage device via said digital data input port.

17. A method of dispensing documents as claimed in claim 16, further comprising the step of switching dispenser execution between the operational program storage device and the reprogram storage device.

18. A method of dispensing documents as claimed in claim 16, further comprising the step of switching dispenser execution from the operational program storage device to the reprogram storage device prior to said downloading step.

19. A method of dispensing documents as claimed in claim 16, further comprising the step of switching dispenser execution from the reprogram storage device to the operational program storage device after said downloading step.

20. A method of dispensing documents as claimed in claim 16, wherein said at least one document dispenser comprises a plurality of document dispensers and said downloading step comprises downloading a plurality of said second document dispenser operational programs to selected ones of said plurality of dispensers.

21. A document dispensing system comprising:
an external operational program data transfer device positioned outside of a stand alone dispenser housing; and
at least one digitally controlled document dispenser programmed to operate according to a document dispenser operational program, said document dispenser comprising a document variables data input terminal, a digital data input port, and said stand alone dispenser housing, said housing incorporating
an internal digital bus positioned within said dispenser housing,
an internal document printer positioned within said dispenser housing and coupled to said digital bus,
an internal operational program storage device positioned within said dispenser housing and coupled to said digital bus, wherein a first document dispenser operational program is stored in said internal operational program storage device, an internal reprogram storage device positioned within said dispenser housing and coupled to said digital bus, and an internal digital controller positioned within said dispenser housing and coupled to said digital bus, wherein said internal digital controller is programmed to cause a second document dispenser operational program received at said digital data input port to be stored in said internal operational program storage device, and control said document printer in accordance with document variables data input at said document variables data input terminal and in accordance with a stored one of said first document dispenser operational program and said second document dispenser operational program in said internal operational program data storage device.

22. A document dispensing system as claimed in claim 21, wherein said operational program data transfer device comprises a host computer.

23. A document dispensing system as claimed in claim 21, wherein said operational program data transfer device is located remote from said dispenser.

24. A document dispensing system as claimed in claim 21, wherein said operational program data transfer device is locally coupled to said document dispenser.

25. A document dispensing system as claimed in claim 21, wherein said operational program data transfer device comprises a file storage and transfer device.

* * * * *